(12) United States Patent
Peng et al.

(10) Patent No.: US 10,484,396 B2
(45) Date of Patent: Nov. 19, 2019

(54) METHOD AND DEVICE FOR EXAMINING MESSAGE INTEGRITY CHECK

(71) Applicant: XI'AN ZHONGXING NEW SOFTWARE CO., LTD., Shaanxi (CN)

(72) Inventors: Jin Peng, Shenzhen (CN); Shilin You, Shenzhen (CN); Jinguo Zhu, Shenzhen (CN); Zhaoji Lin, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 226 days.

(21) Appl. No.: 15/525,124

(22) PCT Filed: May 11, 2015

(86) PCT No.: PCT/CN2015/078709
§ 371 (c)(1),
(2) Date: May 8, 2017

(87) PCT Pub. No.: WO2016/070602
PCT Pub. Date: May 12, 2016

(65) Prior Publication Data
US 2018/0278622 A1   Sep. 27, 2018

(30) Foreign Application Priority Data
Nov. 6, 2014   (CN) .......................... 2014 1 0621450

(51) Int. Cl.
*H04L 29/06* (2006.01)
*H04L 9/06* (2006.01)
(Continued)

(52) U.S. Cl.
CPC .......... *H04L 63/123* (2013.01); *H04L 9/0643* (2013.01); *H04L 63/0876* (2013.01);
(Continued)

(58) Field of Classification Search
None
See application file for complete search history.

(56) References Cited

U.S. PATENT DOCUMENTS

2012/0322479 A1    12/2012  Hakola
2014/0329494 A1*   11/2014  Zisimopoulos ....... H04M 15/66
                                                         455/406

FOREIGN PATENT DOCUMENTS

| CN | 101512958 A | 8/2009 |
| CN | 103379469 A | 10/2013 |

(Continued)

OTHER PUBLICATIONS (Universal Mobile Telecommunications System (UMTS); LTE; Proximity-based Services 1-14 (ProSe); Security aspects (3GPP TS 33.303 VI2.I.O), Oct. 2014 (Oct. 2014) section 6, figure 6.1.3.3.1-1 (Year: 2014).*

(Continued)

*Primary Examiner* — Beemnet W Dada
*Assistant Examiner* — Hassan Saadoun
(74) *Attorney, Agent, or Firm* — Cantor Colburn LLP

(57) ABSTRACT

The method includes: an M-UE home domain ProSe function entity receives a monitoring authentication request response message sent by an A-UE home domain ProSe function entity and acquires first information from the monitoring authentication request response message, in which the first information is used for generating a first MIC; the M-UE home domain ProSe function entity receives a match report sent by an M-UE and acquires second information from the match report, in which the match report carries a second MIC and the second information, and the second information is used for generating the first MIC; and the M-UE home domain ProSe function entity generates the (Continued)

first MIC according to the first information and the second information and examines the first MIC and the second MIC.

14 Claims, 5 Drawing Sheets

(51) Int. Cl.
    *H04W 12/10* (2009.01)
    *H04W 12/06* (2009.01)
    *H04W 76/14* (2018.01)

(52) U.S. Cl.
    CPC ........... *H04W 12/06* (2013.01); *H04W 12/10* (2013.01); *H04W 76/14* (2018.02)

(56) References Cited

FOREIGN PATENT DOCUMENTS

| | | |
|---|---|---|
| CN | 104113831 A | 10/2014 |
| EP | 2725831 A1 | 4/2014 |

OTHER PUBLICATIONS

International Search Report for corresponding application PCT/CN2015/078709 filed on May 11, 2015; dated Jul. 30, 2015.

"3rd Generation Partnership Project; Technical Specification Group Services and System Aspects; Study on Security issues to support Proximity Services (ProSe) (Release 13)", 3GPP Standard; 3GPP TR 33.833, Mobile Competence Centre, Oct. 7, 2014, vol. SA WG3, No. V1.1.0, pp. 1-125.

"Universal Mobile Telecommunications System (UMTS); LTE; Proximity-based Services (ProSe); Security aspects (3GPP TS 33.303 version 12.1.0 Release 12)", Technical Specification, European Telecommunications Standard Institute (ETSI), Oct. 1, 2014, vol. 3GPP SA 3, No. V12.1.0, pp. 1-50.

Extended European Search Report dated Oct. 13, 2017 re: Application No. 15856817.0-1870/3217697 PCT/CN2015/078709, pp. 1-7, citing: "Universal Moble . . . ", "3rd Generaton Partnership . . . ", Defining for the Time . . . and "Correct the condtions . . . ".

Qualcomm Incorporated et al.: "Correct the conditions for sending of Match Report in ProSe Direct Discovery", 3GPP Draft; 33303_CR0016R1_(REL-12)_SE-142314 3rd Generation Partnership Project (3GPP), Mobile Competence Centre, Sep. 12, 2014, vol. SA WG3, No. Sophia Antipolis, pp. 1-3.

Qualcomm Incorporated et al.: "Defining for the time parameter used in ProSe discovery", 3GPP Draft; 33303_CR0022R1_(REL-12)_SE-142315 3rd Generation Partnership Project (3GPP), Mobile Competence Centre, Sep. 12, 2014, vol. SA WG3, No. Sophia Antipolis, pp. 1-5.

* cited by examiner

METHOD AND DEVICE FOR EXAMINING MESSAGE INTEGRITY CHECK

TECHNICAL FIELD

The disclosure relates to the field of communications, and in particular to a method and device for examining a Message Integrity Check (MIC).

BACKGROUND

In order to keep a competitive power of a third generation mobile communication system in the field of communications and to provide mobile communication services with higher rate, lower delay and more personalization for users, and meanwhile to reduce operating cost of operators, the $3^{rd}$ Generation Partnership Project (3GPP) standard group is committed to a study of an Evolved Packet System (EPS). The whole EPS includes an Evolved Universal Terrestrial Radio Access Network (E-UTRAN) and an Evolved Packet Core Networking (EPC), in which the EPC includes a Home Subscriber Server (HSS), a Mobility Management Entity (MME), a Serving GPRS Support Node (SGSN), a Policy and Charging Rule Function (PCRF), a Serving Gateway (S-GW), a PDN Gateway (P-GW) and a Packet Data Network (PDN).

When two User Equipments (UEs) communicate through the EPS, the two UEs respectively need to establish a bearer with the EPS. However, in consideration of rapid development of UEs and various mobile Internet services, many services expect to be able to discover and communicate with near UEs, therefore, a Device to Device (D2D) service is created, the D2D service is also called a Proximity-based Service (ProSe). In the D2D service, two UEs may directly communicate when located close to each other, and the data path connected between the two UEs may not be roundabout to a core network; in this way, a detour of data router may be reduced on one hand, and network data load may be reduced on the other hand; therefore, the D2D service has received attention of many operators.

At present, common D2D services include D2D discovery services, whose communication architecture is as shown in FIG. 1; FIG. 1 is a architecture diagram of a D2D service according to the related art; as shown in FIG. 1, two UEs of D2D can only access an EPC through an E-UTRAN, the two UEs may belong to one same Public Land Mobile Network (PLMN) or separately belong to two PLMNs; for one UE, the PLMN may be divided into a Home PLMN (HPLMN) and a Visited PLMN (VPLMN) which the UE access from other PLMNs; a PLMN of a current area where the UE is located may be collectively called a Local PLMN (LPLMN), no matter the Local PLMN is a HPLMN or a VPLMN. In order to realize D2D discovery services, not only the EPS is deployed at an operator side, but also at least one ProSe application server of the D2D discovery services is deployed; the at least oneProSe application server may be provided by a service provider operating the D2D service, also may be provided by a network operator operating the EPS; ProSe function entities are also deployed at different PLMNs. For the two UEs of ProSe services, one UE acquires a service code that can be announced from a ProSe function entity after the UE acquires a service ID from the ProSe function entity, this UE is called an Announcing UE (A-UE), while another UE accepts announcement of the A-UE, performs match with a ProSe function entity of the other UE and performs ProSe services with the A-UE if the match is successful; this non-announcing UE becomes a Monitoring-UE (M-UE).

In the communication architecture of the D2D discovery service, since the UE provides a relevant ProSe Application (APP), an interface between the UE and a ProSe APP server is a PC1 interface, which provides relevant authentication functions. An interface between one UE and another UE is PC5, which is used for mutual direct discovery and communication between these two UEs; an interface between the UE and the ProSe function entity is PC3, which is used for passing a discovery authentication of a network. Moreover, an interface between the ProSe function entity and an existing EPC is PC4, which includes a user plane interface connected with a P-GW and a control plane interface connected with an HSS and is used for the discovery authentication of the D2D discovery service. In addition, an interface between the ProSe function entity and the ProSe APP server is PC2, which is used for an application implementation of the D2D discovery service. Between a ProSe function entity and a ProSe function entity there is a PC6 and a PC7 respectively, which are used for the roaming and non-roaming conditions of UEs respectively; when the UE is roamed, the PC7 interface is used; when the UE is not roamed, the PC6 interface is used; these two interfaces are used for executing the information interaction between two ProSe function entities when the UE performs the D2D discovery service.

The D2D discovery service may be divided into an open discovery mode and a limited discovery mode.

FIG. 2 is a flowchart of implementing open discovery in the related art; this process includes the following steps:

At S201: an A-UE configures a ProSe Application ID (ProSe APP ID) in an offline mode. The ProSe APP ID is associated with an HPLMN, and the ProSe APP ID contains a PLMN ID of the HPLMN. After the A-UE establishes a safe connection with a ProSe function entity under the HPLMN, the A-UE sends a discovery service request message containing the discovery ProSe APP ID, a discovery service type and a user ID to the ProSe function entity under the HPLMN.

At S202: if the ProSe function entity has no associated context, the ProSe function entity performs discovery service authentication authorization with an HSS and establishes a new UE context containing a subscription parameter of the UE. If the discovery request acquires authentication, the ProSe function entity sends an announcing authentication request to a ProSe function entity of a VPLMN, in which the announcing authentication request carries the ProSe APP ID, the user ID and a ProSe service code allocated by the ProSe function entity under the HPLMN of the A-UE, the ProSe service code being an A-UE announcing code.

At S203: after authenticating the announcing request, the ProSe function entity of the VPLMN of the A-UE returns an announcing authentication request response message to the ProSe function entity under the HPLMN of the A-UE.

At S204: the ProSe function entity of the HPLMN returns a discovery service request response message to the A-UE. The discovery service request response message carries the ProSe service code, a discovery key, a current time and a maximum duration. The ProSe service code is an announcing service code allocated for the A-UE by the ProSe function entity of the HPLMN of the A-UE, the discovery key totally has 128 bits, the current time is Greenwich time, that is, the world unified clock, the A-UE sets the ProSe time of the A-UE according to the current time, that is, synchronizing with time of a network, the maximum duration together with the current time forms the discovery timeslot of the current discovery, that is, a life cycle of the ProSe service code, which is invalid if exceeding the maximum duration.

At S205: the A-UE calculates a 32-bit MIC and then the A-UE announces to air through a broadcast channel, and the announcing message carries the MIC, the ProSe service code and the last 4 bits of the time parameter.

The MIC is obtained using a signature algorithm HMAC (Hash-based Message Authentication Code)-SHA (Secure Hash Algorithm)-256, that is, MIC=HMAC–SHA-256 (discovery key, character string S), in which, the character string S=FC∥P0∥L0∥P1∥L1, FC indicates an algorithm type with fixed length, P0 indicates announcing time, L0 indicates a time length, P1 indicates the ProSe service code, and L1 indicates a length of the service code.

At S206: an M-UE configures a ProSe Application ID (ProSe APP ID) in an offline mode. The ProSe APP ID is associated with an HPLMN, and the ProSe APP ID contains a PLMN ID of the HPLMN. After the M-UE is interested in monitoring at least one ProSe APP ID and establishes a safe connection with a ProSe function entity under the HPLMN of the M-UE, the M-UE sends a discovery service request message containing a list of discovery ProSe APP IDs, a discovery service type and a user ID to the ProSe function entity under the HPLMN.

At S207: if the ProSe function entity has no associated context, the ProSe function entity performs discovery service authentication authorization with the HSS and establishes a new UE context, in which the UE context contains a subscription parameter of the UE. If the discovery request acquires authentication, the ProSe function entity sends a monitoring authentication request to the ProSe function entity under a corresponding HPLMN of the A-UE, in which the announcing authentication request carries the ProSe APP ID and the user ID.

At S208: if the ProSe function entity under the corresponding HPLMN of the A-UE saves the ProSe service code corresponding to the ProSe APP ID, the ProSe function entity under the corresponding HPLMN of the A-UE authenticates the monitoring authentication request message and returns a monitoring authentication request response message to the ProSe function entity under the HPLMN of the M-UE, in which the monitoring authentication request response message carries a mask corresponding to the ProSe service code and a life cycle corresponding to the ProSe service code.

At S209: the ProSe function entity of the HPLMN of the M-UE composes a ProSe service code and a discovery template according to the mask in the monitoring authentication request response message and returns a discovery service request response message to the M-UE. The discovery service request response message carries the discovery template, the current time and the maximum duration. The current time and the maximum duration are the current time and maximum duration of the ProSe function entity of the HPLMN of the M-UE. in The M-UE sets the ProSe clock according to the current time.

At S210: the M-UE receives the announcing information from the A-UE, in which the announcing information includes the MIC, the ProSe service code and the last 4 bits of the time parameter.

At S211: if the M-UE finds that the ProSe service code announced by the A-UE exists in the discovery template and the ProSe service code is within the life cycle of the discovery template, the M-UE sends a match report message to the ProSe function entity of the HPLMN of the M-UE, in which the match report message carries the MIC and the ProSe service code. The M-UE corrects the ProSe time using the last 4 bits of the received time parameter; the match report message also carries the corrected ProSe time corresponding to the M-UE.

At S212: the ProSe function entity of the HPLMN of the M-UE forwards the match report message to the ProSe function entity of the HPLMN of the A-UE.

At S213: the ProSe function entity of the HPLMN of the A-UE acquires the ProSe discovery key according to the ProSe service code parameter carried in the received match report, and calculates an MIC' based on S205 according to the ProSe discovery key and the ProSe time and ProSe service code in the match report; if MIC=MIC', the integrity checking of the received ProSe announcing message is passed; otherwise, it is failed, that is, the ProSe service code of the M-UE is not integrated.

At S214: after successful integrity checking, the ProSe function entity of the HPLMN of the A-UE returns a match report response message to the ProSe function entity of the HPLMN of the M-UE.

At S215: the ProSe function entity of the HPLMN of the M-UE returns a match report response message to the M-UE, in which the match report response message carries the current time of the ProSe function entity of the HPLMN of the M-UE, and the M-UE sets the ProSe time. After the match is successful, the M-UE can perform ProSe communication services with the A-UE.

In the above process, the ProSe function entity of the HPLMN of the M-UE needs to send the received service code to the ProSe function entity of the HPLMN of the A-UE so as to acquire a corresponding APP ID. Meanwhile, the MIC is transmitted to the ProSe function entity of the HPLMN of the A-UE, for the ProSe function entity of the HPLMN of the A-UE to check the message integrity.

However, in the limited discovery mode, the ProSe function entity of the HPLMN of the M-UE parses the application layer user ID according to the service code, without interacting with the ProSe function entity of the HPLMN of the A-UE; therefore, if following an original open discovery process, the integrity checking of messages cannot be completed.

In view of a problem of incapability of completing integrity checking of messages in the limited discovery mode in the related art, no effective solution has been proposed so far.

SUMMARY

At least one embodiment of the disclosure provides a method and device for examining an MIC, to at least solve the problem of incapability of completing integrity checking of messages in the limited discovery mode in the related art.

In an embodiment of the disclosure, a method for examining the MIC is provided, including: receiving, by a monitoring user equipment (M-UE) home domain Proximity-based Service (ProSe) function entity, a monitoring authentication request response message sent by an announcing user equipment (A-UE) home domain ProSe function entity and acquiring, by the M-UE home domain ProSe function entity, first information from the monitoring authentication request response message, wherein the first information is used for generating a first MIC; receiving, by the M-UE home domain ProSe function entity, a match report sent by an M-UE and acquiring, by the M-UE home domain ProSe function entity, second information from the match report, wherein the match report carries a second MIC and the second information, and the second information is used for generating the first MIC; and generating, by the M-UE home domain ProSe function entity, the first MIC according to the first information and the second information and examining, by the M-UE home domain ProSe function entity, the first MIC and the second MIC.

In an example embodiment, the first information includes: a ProSe service code, a life cycle corresponding to the ProSe service code, and a discovery key corresponding to the ProSe service code; and, the second information includes: a discovery service type, a ProSe service code, and a corrected ProSe time corresponding to the M-UE.

In an example embodiment, before receiving, by the M-UE home domain ProSe function entity, the match report sent by the M-UE, the method further includes: saving, by the M-UE home domain ProSe function entity, a corresponding relationship among the ProSe service code, a user identification and the discovery key according to the monitoring authentication request response message.

In an example embodiment, generating, by the M-UE home domain ProSe function entity, the first MIC according to the first information and the second information and examining, by the M-UE home domain ProSe function entity, the first MIC and the second MIC include: acquiring, by the M-UE home domain ProSe function entity, the user identification and the discovery key corresponding to the ProSe service code in the second information according to the corresponding relationship; determining, by the M-UE home domain ProSe function entity, the first MIC according to the ProSe service code in the second information, the user identification corresponding to the ProSe service code in the second information, the discovery key corresponding to the ProSe service code in the second information, the ProSe time and the discovery service type; determining, by the M-UE home domain ProSe function entity, whether the first MIC is the same as the second MIC.

In an example embodiment, determining, by the M-UE home domain ProSe function entity, the first MIC according to the ProSe service code in the second information, the user identification corresponding to the ProSe service code in the second information, the discovery key corresponding to the ProSe service code in the second information, the ProSe time and the discovery service type includes: determining the first MIC using the following formula: MIC=Hash-based Message Authentication Code (HMAC)–Secure Hash Algorithm (SHA)-256 (discovery key, character string S), wherein the character string S includes one of the following: S=FC||P0||L0||P1||L1||P2||L2, S=FC||P0||L0||P1||L1||P3||L3, S=FC||P0||L0||P1||L1||P2||L2||P3||L3, wherein FC indicates an algorithm type with fixed length, P0 indicates ProSe time, L0 indicates a length of the ProSe time, P1 indicates the ProSe service code, L1 indicates a length of the ProSe service code, P2 indicates the discovery service type, L2 indicates the length of the discovery service type, P3 indicates the user identification corresponding to the ProSe service code in the second information, and L3 indicates a length of the user identification corresponding to the ProSe service code in the second information.

In an example embodiment, after examining the first MIC and the second MIC, the method further includes: sending, by the M-UE home domain ProSe function entity, a match report response message to the M-UE, wherein the match report response message carries a user identification corresponding to a ProSe service code in the second information.

In an example embodiment, the discovery service type includes: a limited discovery service.

In another embodiment of the disclosure, an device for examining the MIC is provided, which is applied to a monitoring user equipment (M-UE) home domain Proximity-based Service (ProSe) function entity, including: a first receiving component, which is arranged to receive a monitoring authentication request response message sent by an announcing user equipment (A-UE) home domain ProSe function entity and acquire first information from the monitoring authentication request response message, wherein the first information is used for generating a first MIC; a second receiving component, which is arranged to receive a match report sent by an M-UE and acquire second information from the match report, wherein the match report carries a second MIC and the second information, the second information being used for generating the first MIC; and an examination component, which is arranged to generate the first MIC according to the first information and the second information and examine the first MIC and the second MIC.

In an example embodiment, the first information includes: a ProSe service code, a life cycle corresponding to the ProSe service code, and a discovery key corresponding to the ProSe service code; and, the second information includes: a discovery service type, a ProSe service code, and a corrected ProSe time corresponding to the M-UE.

In an example embodiment, the device further includes: a saving component, which is arranged to save a corresponding relationship among the ProSe service code, a user identification and the discovery key according to the monitoring authentication request response message.

In an example embodiment, the examination component includes: an acquisition element, which is arranged to acquire the user identification and the discovery key corresponding to the ProSe service code in the second information according to the corresponding relationship; a determination element, which is arranged to determine the first MIC according to the ProSe service code in the second information, the user identification corresponding to the ProSe service code in the second information, the discovery key corresponding to the ProSe service code in the second information, the ProSe time and the discovery service type; and a judgment element, which is arranged to judge whether the first MIC is the same as the second MIC.

In an example embodiment, the determination element is arranged to determine the first MIC using the following formula: MIC=Hash-based Message Authentication Code (HMAC)–Secure Hash Algorithm (SHA)-256 (discovery key, character string S), wherein the character string S includes one of the following: S=FC||P0||L0||P1||L1||P2||L2, S=FC||P0||L0||P1||L1||P3||L3, S=FC||P0||L0||P1||L1||P2||L2||P3||L3, wherein FC indicates an algorithm type with fixed length, P0 indicates ProSe time, L0 indicates a length of the ProSe time, P1 indicates the ProSe service code, L1 indicates a length of the ProSe service code, P2 indicates the discovery service type, L2 indicates the length of the discovery service type, P3 indicates the user identification corresponding to the ProSe service code in the second information, and L3 indicates a length of the user identification corresponding to the ProSe service code in the second information.

In an example embodiment, the device further includes: a sending component, which is arranged to send a match report response message to the M-UE, wherein the match report response message carries a user identification corresponding to a ProSe service code in the second information.

In an example embodiment, the discovery service type includes: a limited discovery service.

Through the technical scheme provided by at least one embodiment of the disclosure, the M-UE home domain ProSe function entity receives the monitoring authentication request response message sent by the A-UE home domain ProSe function entity and acquires first information from the monitoring authentication request response message, in which the first information is used for generating the first MIC; the M-UE home domain ProSe function entity receives a match report sent by the M-UE and acquires second information from the match report, in which the match report carries the second MIC and the second information, and the second information is used for generating the first MIC; and the M-UE home domain ProSe function entity generates the first MIC according to the first information and the second information and examines the first MIC and the second MIC. The embodiments of disclosure solve the problem of incapability of completing integrity checking of messages in a limited discovery mode in the related art, thereby achieving the effect of realizing integrity checking of messages in the limited discovery mode.

BRIEF DESCRIPTION OF THE DRAWINGS

For a better understanding of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION

The disclosure is described below in detail by reference to the accompanying drawings in conjunction with embodiments. It needs to be noted that the embodiments in the application and the characteristics of the embodiments can be combined if no conflict is caused.

Figure 1:
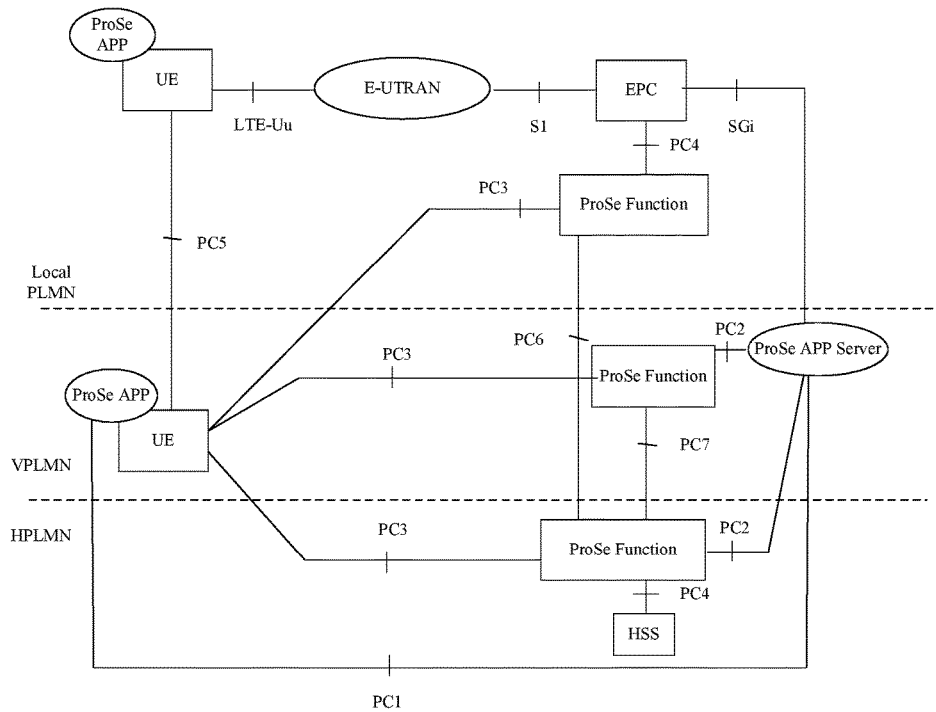
FIG. 1 is a architecture diagram of a D2D service according to the related art.
Figure 2:
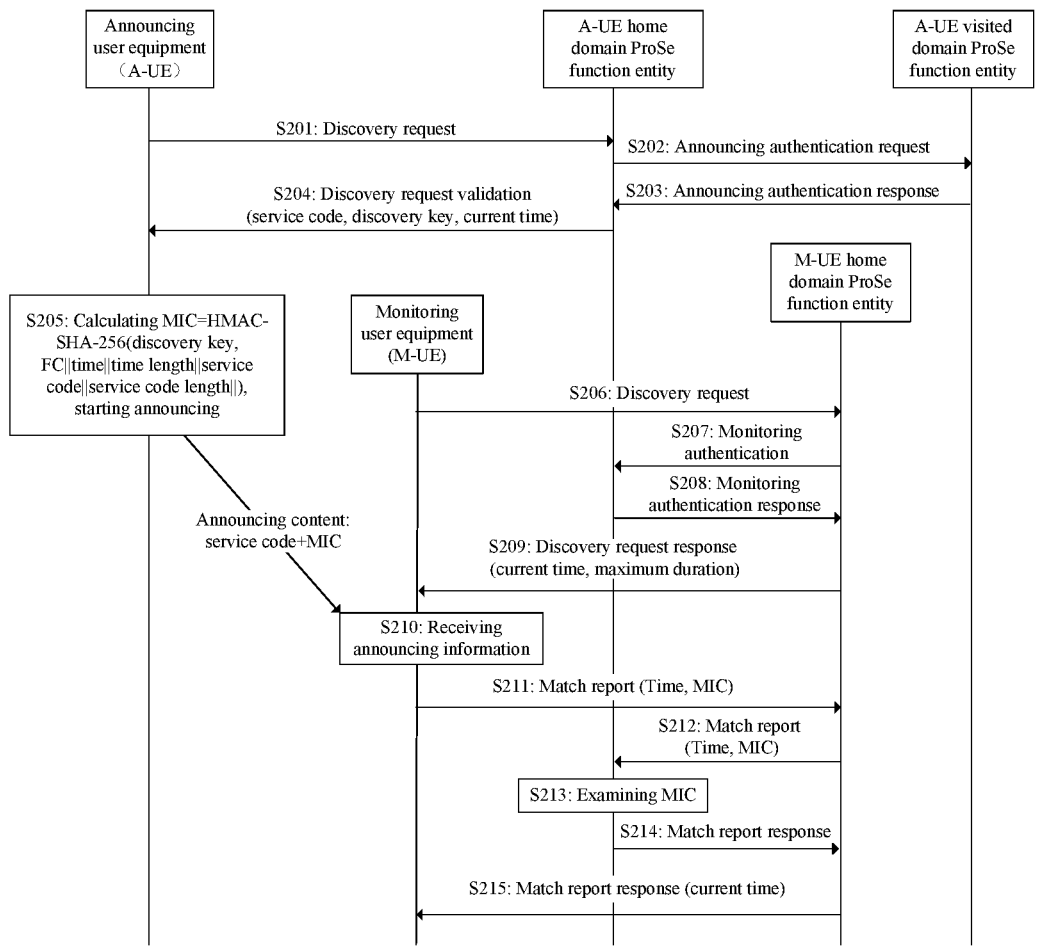
FIG. 2 is a flowchart of implementing open discovery according to the related art.
Figure 3:
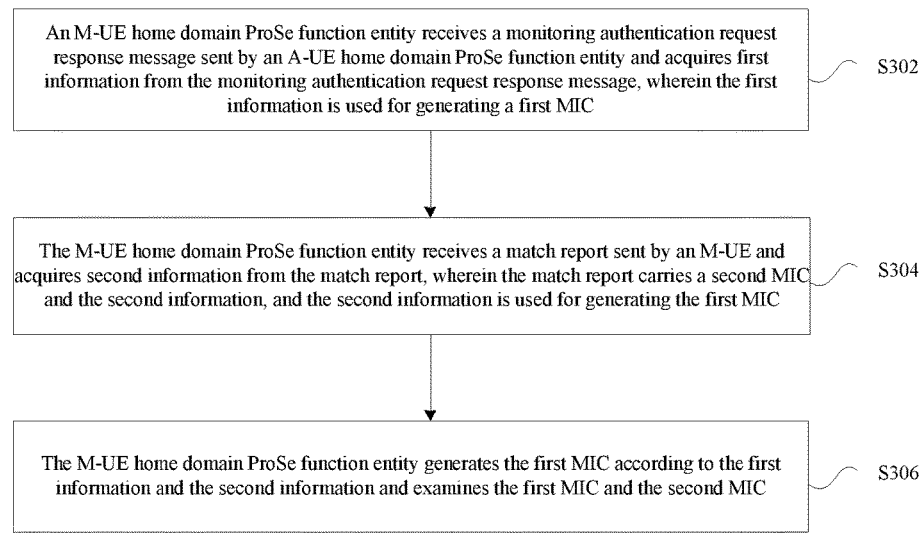
FIG. 3 is a flowchart of a method for examining an MIC according to an embodiment of the disclosure.

A method for examining an MIC is provided in this embodiment, FIG. 3 is a flowchart of a method for examining the MIC according to an embodiment of the disclosure; as shown in FIG. 3, the process includes the following steps:

At S302: an M-UE home domain ProSe function entity receives a monitoring authentication request response message sent by an A-UE home domain ProSe function entity and acquires first information from the monitoring authentication request response message, wherein the first information is used for generating a first MIC.

At S304: the M-UE home domain ProSe function entity receives a match report sent by an M-UE and acquires second information from the match report, wherein the match report carries a second MIC and the second information, and the second information is used for generating the first MIC.

At S306: the M-UE home domain ProSe function entity generates the first MIC according to the first information and the second information and examines the first MIC and the second MIC.

Through the above steps, when conducting MIC examination, it is not needed to perform interaction of information with the A-UE home domain ProSe function entity, the M-UE home domain ProSe function entity may generate an MIC according to the first information acquired from the monitoring authentication request response message and the second information acquired from the match report, and then examine the generated MIC and the MIC carried in the match report, thereby completing the integrity checking of ProSe announcing messages, reducing the message interaction between the M-UE home domain ProSe function entity and the A-UE home domain ProSe function entity, and solving the problem of incapability of completing integrity checking of messages in a limited discovery mode in related art, thus achieving the effect of realizing integrity checking of messages in the limited discovery mode.

Information needed to generate an MIC may be determined according to an algorithm, information included in the first information and the second information needs to generate an MIC, specifically, the content included in the first information and the second information may be flexibly determined; for example, in an optional embodiment, the first information may include: a ProSe service code, a life cycle corresponding to the ProSe service code, and a discovery key corresponding to the ProSe service code; and/or, the second information may include: a discovery service type (for example, limited discovery), a ProSe service code, and a corrected ProSe time corresponding to the M-UE.

In the condition that the first information may include a ProSe service code, a life cycle corresponding to the ProSe service code and a discovery key corresponding to the ProSe service code, before the M-UE home domain ProSe function entity receives the match report sent by the M-UE, the M-UE home domain ProSe function entity has acquired this information, at this time in an optional embodiment, the M-UE home domain ProSe function entity may save a corresponding relationship among the ProSe service code, a user identification and the discovery key according to the monitoring authentication request response message. Saving the corresponding relationship among the ProSe service code, the user identification and the discovery key in advance may enable the corresponding relationship to be conveniently called when subsequently generating the MIC, so as to accelerate the determination speed.

There may be many methods for matching the MIC, for example, the M-UE home domain ProSe function entity may acquire the user identification and the discovery key corresponding to the ProSe service code in the second information according to the corresponding relationship saved in advance; the M-UE home domain ProSe function entity determines the MIC according to the ProSe service code in the second information, the user identification corresponding to the ProSe service code in the second information, the discovery key corresponding to the ProSe service code in the second information, the ProSe time and the discovery service type; the M-UE home domain ProSe function entity determines whether the determined MIC is the same as the MIC carried in the match report. Moreover, in the condition that the determination result is that the determined MIC is the same as the MIC carried in the match report, it is indicated that the ProSe announcing message is integrated; in the condition that the determination result is that the determined MIC is not the same as the MIC carried in the match report, it is indicated that the ProSe announcing message is not integrated. Moreover, this determination process is completed by the M-UE home domain ProSe function entity, without message interaction with the A-UE home domain ProSe function entity, so that the message interaction with the A-UE home domain ProSe function entity is reduced.

There may be many determination ways for the M-UE home domain ProSe function entity determining the MIC according to the ProSe service code in the second information, the user identification corresponding to the ProSe service code in the second information, the discovery key corresponding to the ProSe service code in the second information, the ProSe time and the discovery service type, for example, in an optional embodiment, a following formula may be adopted to determine the MIC:

$$MIC=HMAC\text{-}SHA\text{-}256(\text{discovery key, character string } S),$$

in which the character string S includes one of the following:

S=FC||0||L0||P1||L1||P2||L2,
S=FC||P0||L0||P1||L1||P3||L3,
S=FC||P0||L0||P1||L1||P2||L2||P3||L3, in which FC indicates an algorithm type with fixed length, P0 indicates ProSe time, L0 indicates a length of the ProSe time, P1 indicates the ProSe service code, L1 indicates a length of the ProSe service code, P2 indicates the discovery service type, L2 indicates the length of the discovery service type, P3 indicates the user identification corresponding to the ProSe service code in the second information, and L3 indicates a length of the user identification corresponding to the ProSe service code in the second information.

Moreover, after examining the generated MIC and the MIC carried in the match report, the method further includes that: the M-UE home domain ProSe function entity sends a match report response message to the M-UE, in which the match report response message carries the user identification corresponding to the ProSe service code in the second information.

A device for examining an MIC is further provided in this embodiment; this device is arranged to realize the above embodiments and example implementations; what has been described above is not repeated below. Term "component" used below can realize the combination of at least one of software and hardware with preset functions. Although the device described in the following embodiments preferably is implemented in the form of software, the implementation in the form of hardware or the combination of software and hardware is possible and conceived.

Figure 4:
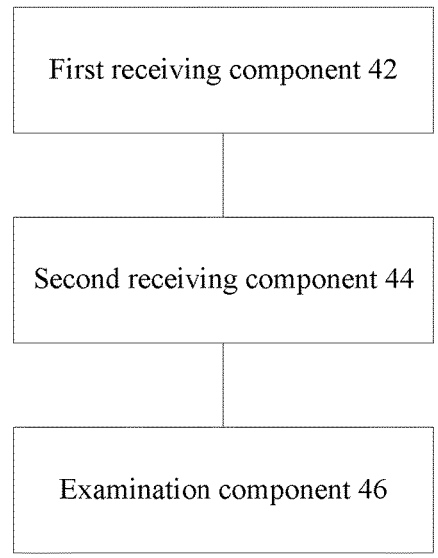
FIG. 4 is a structural block diagram of a device for examining an MIC according to an embodiment of the disclosure.

FIG. 4 is a structural block diagram of a device for examining an MIC according to an embodiment of the disclosure; the device for examining the MIC may be applied to an M-UE home domain ProSe function entity, as shown in FIG. 4, the device includes a first receiving component 42, a second receiving component 44 and an examination component 46; a description for the device is provided below.

The first receiving component 42 is arranged to receive a monitoring authentication request response message sent by an A-UE home domain ProSe function entity and acquire first information from the monitoring authentication request response message, in which the first information is used for generating a first MIC; the second receiving component 44 is connected to the first receiving component 42 and is arranged to receive a match report sent by an M-UE and acquire second information from the match report, in which the match report carries a second MIC and the second information, and the second information is used for generating the first MIC; the examination component 46 is connected with the second receiving component 44 and is arranged to generate the first MIC according to the first information and the second information and examine the first MIC and the second MIC.

Information needed to generate an MIC may be determined according to an algorithm, information included in the first information and the second information needs to generate an MIC, specifically, the content included in the first information and the second information may be flexibly determined; for example, in an optional embodiment, the first information may include: a ProSe service code, a life cycle corresponding to the ProSe service code, and a discovery key corresponding to the ProSe service code; and/or, the second information may include: a discovery service type (for example, limited discovery), a ProSe service code, and a corrected ProSe time corresponding to the M-UE.

Figure 5:
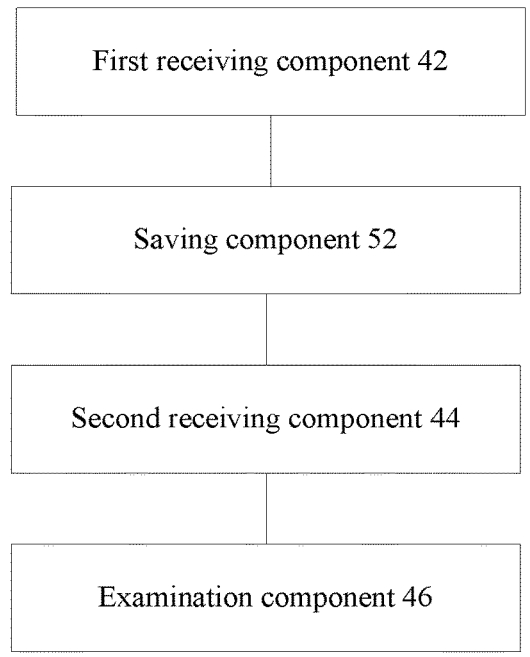
FIG. 5 is a structural block diagram of a device for examining an MIC according to a first embodiment of the disclosure.

In the condition that the first information may include a ProSe service code, a life cycle corresponding to the ProSe service code and a discovery key corresponding to the ProSe service code, before the M-UE home domain ProSe function entity receives the match report sent by the M-UE, the M-UE home domain ProSe function entity has acquired this information, at this time in an optional embodiment, the M-UE home domain ProSe function entity may save a corresponding relationship among the ProSe service code, a user identification and the discovery key according to the monitoring authentication request response message. FIG. 5 is a structural block diagram of a device for examining an MIC according to a first embodiment of the disclosure; as shown in FIG. 5, besides all components shown in FIG. 4, the device further includes a saving component 52, which is described below.

The saving component 52 is connected with the first receiving component 42 and the second receiving component 44 and is arranged to save a corresponding relationship among the ProSe service code, a user identification and the discovery key according to the monitoring authentication request response message.

Figure 6:
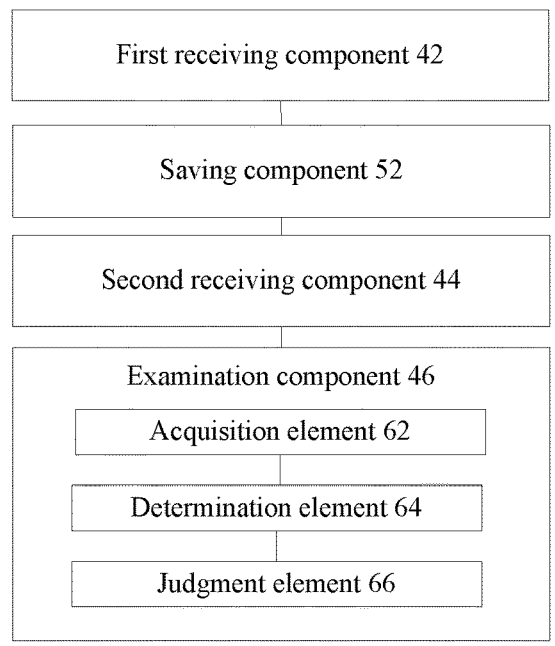
FIG. 6 is a structural block diagram of an examination component 46 of a device for examining an MIC according to an embodiment of the disclosure.

There may be many methods for examining the MIC; the MIC examination method is described below in conjunction with an optional embodiment. FIG. 6 is a structural block diagram of an examination component 46 of a device for examining an MIC according to an embodiment of the disclosure; as shown in FIG. 6, the examination component 46 includes an acquisition element 62, a determination element 64 and a judgment element 66; the examination component 46 is described below.

The acquisition element 62 is arranged to acquire the user identification and the discovery key corresponding to the ProSe service code in the second information according to the corresponding relationship; the determination element 64 is connected with the acquisition element 62 and is arranged to determine the MIC according to the ProSe service code in the second information, the user identification corresponding to the ProSe service code in the second information, the discovery key corresponding to the ProSe service code in the second information, the ProSe time and the discovery service type; the judgment element 66 is connected with the determination element 64 and is arranged to judge whether the first MIC is the same as the second MIC.

There may be many determination ways for the M-UE home domain ProSe function entity determining the MIC according to the ProSe service code in the second information, the user identification corresponding to the ProSe service code in the second information, the discovery key corresponding to the ProSe service code in the second information, the ProSe time and the discovery service type, for example, in an optional embodiment, in the determination element 64, a following formula may be adopted to determine the MIC:

$$\text{MIC}=\text{HMAC-SHA-256}(\text{discovery key, character string }S),$$

in which the character string S includes one of the following:
S=FC∥P0∥L0∥P1∥L1∥P2∥L2,
S=FC∥P0∥L0∥P1∥L1∥P3∥L3,
S=FC∥P0∥L0∥P1∥L1∥P2∥L2∥P3∥L3, in which FC indicates an algorithm type with fixed length, P0 indicates ProSe time, L0 indicates a length of the ProSe time, P1 indicates the ProSe service code, L1 indicates a length of the ProSe service code, P2 indicates the discovery service type, L2 indicates the length of the discovery service type, P3 indicates the user identification corresponding to the ProSe service code in the second information, and L3 indicates a length of the user identification corresponding to the ProSe service code in the second information.

Figure 7:
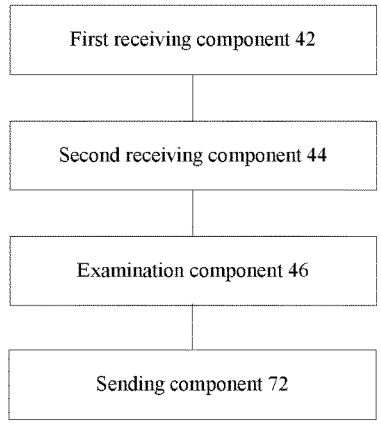
FIG. 7 is a structural block diagram of a device for examining an MIC according to a second embodiment of the disclosure.

Moreover, after the MIC examination is completed, a match report response message is sent to the M-UE; FIG. 7 is a structural block diagram of a device for examining an MIC according to a second embodiment of the disclosure; as shown in FIG. 7, the device for examining the MIC further includes a sending component 72 besides all components shown in FIG. 4; the sending component 72 is described below.

The sending component 72 is connected with the examination component 46 and is arranged to send a match report response message to the M-UE, in which the match report response message carries the user identification corresponding to the ProSe service code in the second information.

A description is provided below in conjunction with an optional embodiment by taking the service type being "limited discovery" for example.

Figure 8:
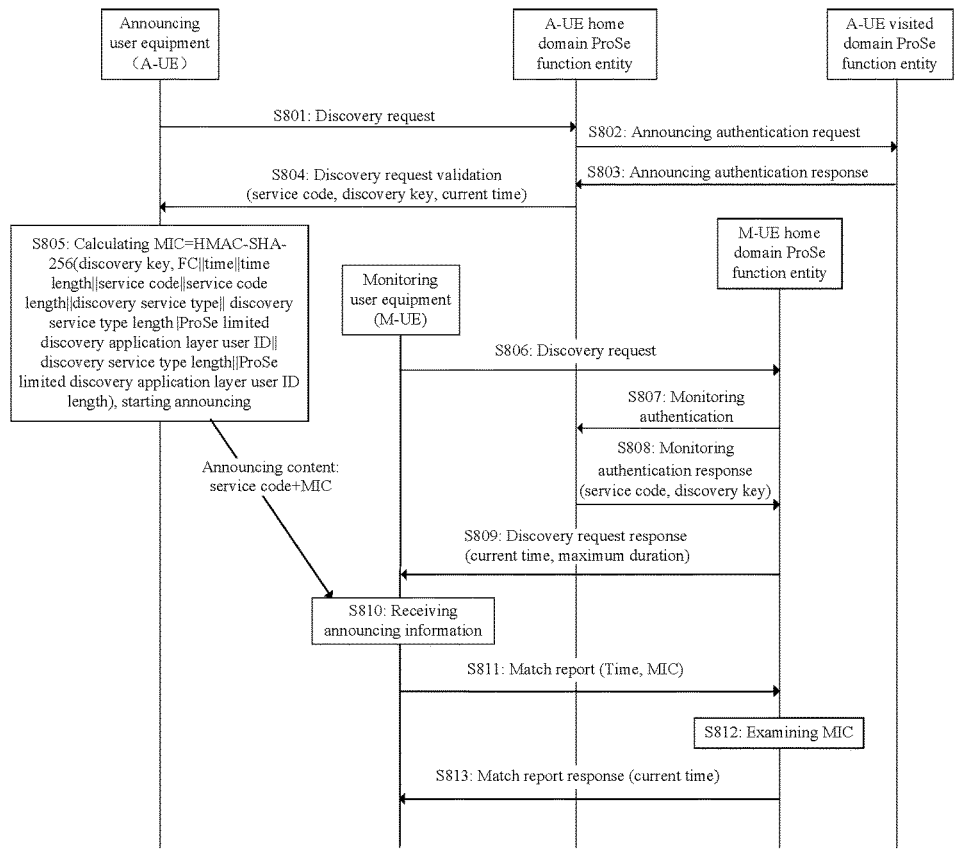
FIG. 8 is a flowchart of D2D limited discovery of an M-UE home domain ProSe function entity performing MIC examination according to an embodiment of the disclosure.

In this optional embodiment, a process of D2D limited discovery is provided. FIG. 8 is a flowchart of D2D limited discovery of an M-UE home domain ProSe function entity performing MIC examination according to the embodiment of the disclosure. As shown in FIG. 8, the process includes the following steps.

At S801: an A-UE configures a ProSe Application ID (ProSe APP ID) in an offline mode. The ProSe APP ID is associated with an HPLMN, and the ProSe APP ID contains a PLMN ID of the HPLMN. After the A-UE establishes a safe connection with a ProSe function entity under the HPLMN, the A-UE sends a discovery service request message containing the discovery ProSe APP ID, a discovery service type and a user ID to the ProSe function entity under the HPLMN, in which the service type is limited discovery.

At S802: if the ProSe function entity has no associated context, the ProSe function entity performs discovery service authentication authorization with an HSS and establishes a new UE context containing a subscription parameter of the UE. If the discovery request acquires authentication, the ProSe function entity sends an announcing authentication request to a ProSe function entity of a VPLMN, in which the announcing authentication request carries the ProSe APP ID, the user ID and a ProSe service code allocated by the ProSe function entity under the HPLMN of the A-UE, the ProSe service code being an A-UE announcing code.

At S803: after authenticating the announcing request, the ProSe function entity of the VPLMN of the A-UE returns an announcing authentication request response message to the ProSe function entity under the HPLMN of the A-UE.

At S804: the ProSe function entity of the HPLMN returns a discovery service request response message to the A-UE. The discovery service request response message carries the ProSe service code, a discovery key, a current time and a maximum duration. The ProSe service code is an announcing service code allocated for the A-UE by the ProSe function entity of the HPLMN of the A-UE, the discovery key totally has 128 bits, the current time is Greenwich time, that is, the world unified clock, the A-UE sets the ProSe time of the A-UE according to the current time, that is, synchronizing with time of a network, the maximum duration together with the current time forms the discovery timeslot of the current discovery, that is, a life cycle of the ProSe service code, which is invalid if exceeding the maximum duration.

At S805: the A-UE calculates a 32-bit MIC and then the A-UE announces to air through a broadcast channel, and the announcing message carries the MIC, the ProSe service code and the last 4 bits of the time parameter.

The MIC is obtained using a signature algorithm HMAC–SHA-256, that is, MIC=HMAC-SHA-256 (discovery key, character string S), in which the character string S=FC∥P0∥L0∥P1∥L1(∥P2∥L2)(∥P3∥L3), FC indicates an algorithm type with fixed length, P0 indicates announcing time, L0 indicates a time length, P1 indicates the ProSe service code, and L1 indicates a length of the service code, optionally, P2 indicates the discovery service type, L2 indicates the length of the discovery service type, optionally, P3 indicates the user identification of the limited discovery application layer, and L3 indicates the length of the user identification of the limited discovery application layer.

At S806: an M-UE configures a ProSe Application ID (ProSe APP ID) in an offline mode The ProSe APP ID is associated with an HPLMN, and the ProSe APP ID contains a PLMN ID of the HPLMN. After the M-UE is interested in monitoring at least one ProSe APP ID and establishes a safe connection with a ProSe function entity under the HPLMN of the M-UE, the M-UE sends a discovery service request message to the ProSe function entity under the HPLMN, the discovery service request message containing a list of discovery ProSe APP IDs, a discovery service type and a user ID, and the service type is limited discovery.

S807: if the ProSe function entity has no associated context, the ProSe function entity performs discovery service authentication authorization with the HSS and establishes a new UE context, in which the UE context contains a subscription parameter of the UE. If the discovery request acquires authentication, the ProSe function entity sends a monitoring authentication request to the ProSe function entity under a corresponding HPLMN of the A-UE, in which the announcing authentication request carries the ProSe APP ID and the user ID.

At S808: if the ProSe function entity under the corresponding HPLMN of the A-UE saves the ProSe service code corresponding to the ProSe APP ID, the ProSe function entity under the corresponding HPLMN of the A-UE authenticates the monitoring authentication request message and returns a monitoring authentication request response message to the ProSe function entity under the HPLMN of the M-UE, in which the monitoring authentication request response message carries the ProSe service code, a life cycle corresponding to the ProSe service code and the discovery key corresponding to the ProSe service code.

At S809: the ProSe function entity of the HPLMN of the M-UE saves a corresponding relationship among the ProSe service code, the corresponding ProSe limited discovery application layer user ID and the discovery key. The ProSe function entity of the HPLMN of the M-UE composes a discovery template according to the ProSe service code in the monitoring authentication request response message and returns a discovery service request response message to the M-UE. The discovery service request response message carries the discovery template, the current time and the maximum duration. The current time and the maximum duration are the current time and maximum duration of the ProSe function entity of the HPLMN of the M-UE. The M-UE sets the ProSe clock according to the current time.

At S810: the M-UE receives the announcing information from the A-UE, in which the announcing information includes the MIC, the ProSe service code and the last 4 bits of the time parameter.

At S811: if the M-UE finds that the ProSe service code announced by the A-UE exists in the discovery template and the ProSe service code is within the life cycle of the discovery template, the M-UE sends a match report message to the ProSe function entity of the HPLMN of the M-UE, in which the match report message carries the discovery service type, the MIC and the ProSe service code, wherein the discovery service type is "limited discovery". The M-UE corrects the ProSe time using the last 4 bits of the received time parameter; the match report message also carries the corrected ProSe time corresponding to the M-UE.

At S812: the ProSe function entity of the HPLMN of the M-UE acquires the ProSe limited discovery application layer user ID and ProSe discovery key according to the ProSe service code parameter carried in the received match report in conjunction with the corresponding relationship saved in S809, and calculates an MIC' based on S805 according to the ProSe limited discovery application layer user ID, the ProSe discovery key, and the ProSe time, ProSe service code and discovery service type in the match report; if MIC=MIC', the integrity checking of the received ProSe announcing message is passed; otherwise, it MIC≠MIC', that is, the ProSe service code of the M-UE is not integrated.

At S813: the ProSe function entity of the HPLMN of the M-UE returns a match report response message to the M-UE, in which the match report response message carries the ProSe limited discovery application layer user ID corresponding to the ProSe service code and the current time of the ProSe function entity of the HPLMN of the M-UE, and the M-UE sets the ProSe time. After the match is successful, the M-UE can perform ProSe communication services with the A-UE.

FIG. 8 shows the process of D2D limited discovery of the ProSe function entity (the same as the above M-UE home domain ProSe function entity) under the corresponding HPLMN of the M-UE performing MIC examination. In this process, during the monitoring process of limited discovery, the ProSe function entity under the corresponding HPLMN of the A-UE returns the monitoring authentication request response message to the ProSe function entity under the HPLMN of the M-UE, the monitoring authentication request response message carrying the ProSe service code, the life cycle corresponding to the ProSe service code and the discovery key corresponding to the ProSe service code. The ProSe function entity of the HPLMN of the M-UE saves the corresponding relationship between the ProSe service code and the corresponding discovery key. During the match process of limited discovery, the ProSe function entity of the HPLMN of the M-UE acquires the ProSe discovery key according to the ProSe service code parameter carried in the received match report in conjunction with the corresponding relationship previously saved in the monitoring process; then, according to the ProSe discovery key and the ProSe time and ProSe service code in the match report, the ProSe function entity of the HPLMN of the M-UE calculates an MIC' and validates whether the calculated MIC' is the same as the MIC carried in the match report message so as to examine the integrity of the received ProSe announcing message.

In the above embodiment, the ProSe function entity of the HPLMN of the M-UE completes the integrity examination of the ProSe announcing message, thereby reducing the interaction messages between the ProSe function entity of the HPLMN of the M-UE and the ProSe function entity of the HPLMN of the A-UE and improving the entire processing efficiency.

Obviously, those skilled in the art should understand that the components or steps described above can be implemented by a common computer device; the components or steps can be integrated on a single computing device or distributed on a network composed of a plurality of computing devices; optionally, the components or steps can be implemented by a programming code executable by a computing device, thus they can be stored in a storage device to be executed by a computing device and executed in a different order in some cases, or manufactured into individual integrated circuit component respectively, or several of them can be manufactured into a single integrated circuit component to implement; in this way, the disclosure is not limited to any combination of specific hardware and software.

The above are only the example embodiments of the disclosure and not intended to limit the disclosure. For those skilled in the art, various modifications and changes can be made to the disclosure. Any modification, equivalent substitution and improvement made within the spirit and principle of the disclosure are intended to be included within the scope of protection of the disclosure.

INDUSTRIAL APPLICABILITY

As described above, the method and device for examining the MIC provided by the embodiment of the disclosure have benefits as follows: realizing the capability of integrity checking of messages in the limited discovery mode and improving the entire processing efficiency.

What is claimed is:
1. A method for examining a Message Integrity Check (MIC), comprising:
receiving, by a monitoring user equipment (M-UE) home domain Proximity-based Service (ProSe) function entity, a monitoring authentication request response message sent by an announcing user equipment (A-UE) home domain ProSe function entity and acquiring, by the M-UE home domain ProSe function entity, first information from the monitoring authentication request response message, wherein the first information is used for generating a first MIC;

receiving, by the M-UE home domain ProSe function entity, a match report sent by an M-UE and acquiring, by the M-UE home domain ProSe function entity, second information from the match report, wherein the match report carries a second MIC and the second information, and the second information is used for generating the first MIC; and generating, by the M-UE home domain ProSe function entity, the first MIC according to the first information and the second information and examining, by the M-UE home domain ProSe function entity, the first MIC and the second MIC.

2. The method as claimed in claim 1, wherein
the first information comprises: a ProSe service code, a life cycle corresponding to the ProSe service code, and a discovery key corresponding to the ProSe service code; and,
the second information comprises: a discovery service type, a ProSe service code, and a corrected ProSe time corresponding to the M-UE.

3. The method as claimed in claim 2, wherein before receiving, by the M-UE home domain ProSe function entity, the match report sent by the M-UE, the method further comprises:
saving, by the M-UE home domain ProSe function entity, a corresponding relationship among the ProSe service code, a user identification and the discovery key according to the monitoring authentication request response message.

4. The method as claimed in claim 3, wherein generating, by the M-UE home domain ProSe function entity, the first MIC according to the first information and the second information and examining, by the M-UE home domain ProSe function entity, the first MIC and the second MIC comprise:
acquiring, by the M-UE home domain ProSe function entity, the user identification and the discovery key corresponding to the ProSe service code in the second information according to the corresponding relationship;
determining, by the M-UE home domain ProSe function entity, the first MIC according to the ProSe service code in the second information, the user identification corresponding to the ProSe service code in the second information, the discovery key corresponding to the ProSe service code in the second information, the ProSe time and the discovery service type;
determining, by the M-UE home domain ProSe function entity, whether the first MIC is the same as the second MIC.

5. The method as claimed in claim 4, wherein determining, by the M-UE home domain ProSe function entity, the first MIC according to the ProSe service code in the second information, the user identification corresponding to the ProSe service code in the second information, the discovery key corresponding to the ProSe service code in the second information, the ProSe time and the discovery service type comprises:
determining the first MIC using the following formula:

MIC=Hash-based Message Authentication Code (HMAC)–Secure Hash Algorithm (SHA)-256

(discovery key,character string *S*), wherein the character string S comprises one of the following:

S=FC||P0||L0||P1||L1||P2||L2,
S=FC||P0||L0||P1||L1||P3||L3,
S=FC||P0||L0||P1||L1||P2||L2||P3||L3, wherein FC indicates an algorithm type with fixed length, P0 indicates ProSe time, L0 indicates a length of the ProSe time, P1 indicates the ProSe service code, L1 indicates a length of the ProSe service code, P2 indicates the discovery service type, L2 indicates the length of the discovery service type, P3 indicates the user identification corresponding to the ProSe service code in the second information, and L3 indicates a length of the user identification corresponding to the ProSe service code in the second information.

6. The method as claimed in claim 1, wherein after examining the first MIC and the second MIC, the method further comprises:
sending, by the M-UE home domain ProSe function entity, a match report response message to the M-UE, wherein the match report response message carries a user identification corresponding to a ProSe service code in the second information.

7. The method as claimed in claim 2, wherein the discovery service type comprises: a limited discovery service.

8. A device for examining a Message Integrity Check (MIC), applied to a monitoring user equipment (M-UE) home domain Proximity-based Service (ProSe) function entity, comprising a processor, configured to perform programming componets stored in a memory, wherein the programming components comprise:
a first receiving component, which is arranged to receive a monitoring authentication request response message sent by an announcing user equipment (A-UE) home domain ProSe function entity and acquire first information from the monitoring authentication request response message, wherein the first information is used for generating a first MIC;
a second receiving component, which is arranged to receive a match report sent by an M-UE and acquire second information from the match report, wherein the match report carries a second MIC and the second information, and the second information is used for generating the first MIC; and
an examination component, which is arranged to generate the first MIC according to the first information and the second information and examine the first MIC and the second MIC.

9. The device as claimed in claim 8, wherein
the first information comprises: a ProSe service code, a life cycle corresponding to the ProSe service code, and a discovery key corresponding to the ProSe service code; and,
the second information comprises: a discovery service type, a ProSe service code, and a corrected ProSe time corresponding to the M-UE.

10. The device as claimed in claim 9, wherein further comprising:
a saving component, which is arranged to save a corresponding relationship among the ProSe service code, a user identification and the discovery key according to the monitoring authentication request response message.

11. The device as claimed in claim 10, wherein the examination component comprises:

an acquisition element, which is arranged to acquire the user identification and the discovery key corresponding to the ProSe service code in the second information according to the corresponding relationship;

a determination element, which is arranged to determine the first MIC according to the ProSe service code in the second information, the user identification corresponding to the ProSe service code in the second information, the discovery key corresponding to the ProSe service code in the second information, the ProSe time and the discovery service type; and a judgment element, which is arranged to judge whether the first MIC is the same as the second MIC.

12. The device as claimed in claim 11, wherein the determination element is arranged to determine the first MIC using the following formula:

MIC=Hash-based Message Authentication Code (HMAC)–Secure Hash Algorithm (SHA)-256 (discovery key,character string $S$), wherein the character string S comprises one of the following:

S=FC∥P0∥L0∥P1∥L1∥P2∥L2,
S=FC∥P0∥L0∥P1∥L1∥P3∥L3,
S=FC∥P0∥L0∥P1∥L1∥P2∥L2∥P3∥L3, wherein FC indicates an algorithm type with fixed length, P0 indicates ProSe time, L0 indicates a length of the ProSe time, P1 indicates the ProSe service code, L1 indicates a length of the ProSe service code, P2 indicates the discovery service type, L2 indicates the length of the discovery service type, P3 indicates the user identification corresponding to the ProSe service code in the second information, and L3 indicates a length of the user identification corresponding to the ProSe service code in the second information.

13. The device as claimed in claim 8, wherein further comprising:

a sending component, which is arranged to send a match report response message to the M-UE, wherein the match report response message carries a user identification corresponding to a ProSe service code in the second information.

14. The device as claimed in claim 9, wherein the discovery service type comprises: a limited discovery service.

* * * * *